United States Patent Office 2,962,795
Patented Dec. 6, 1960

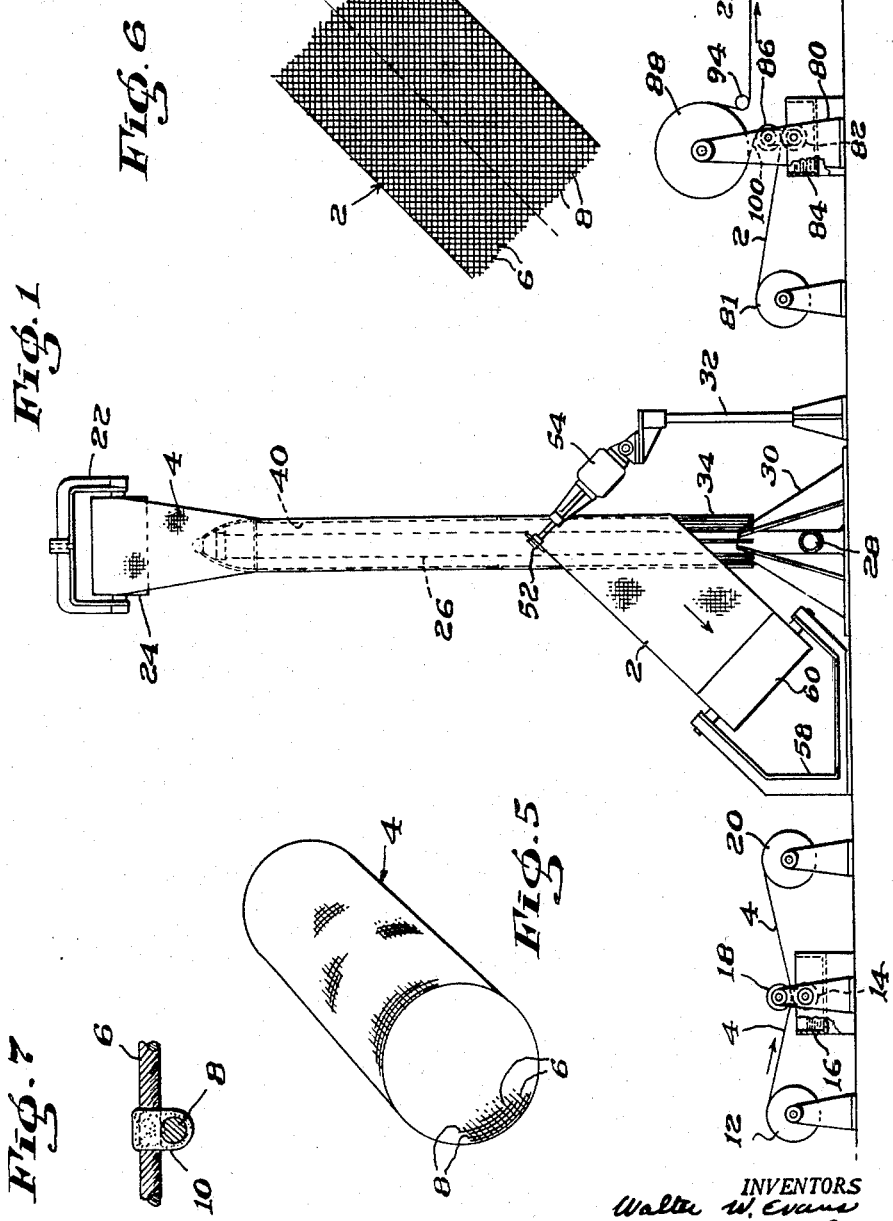

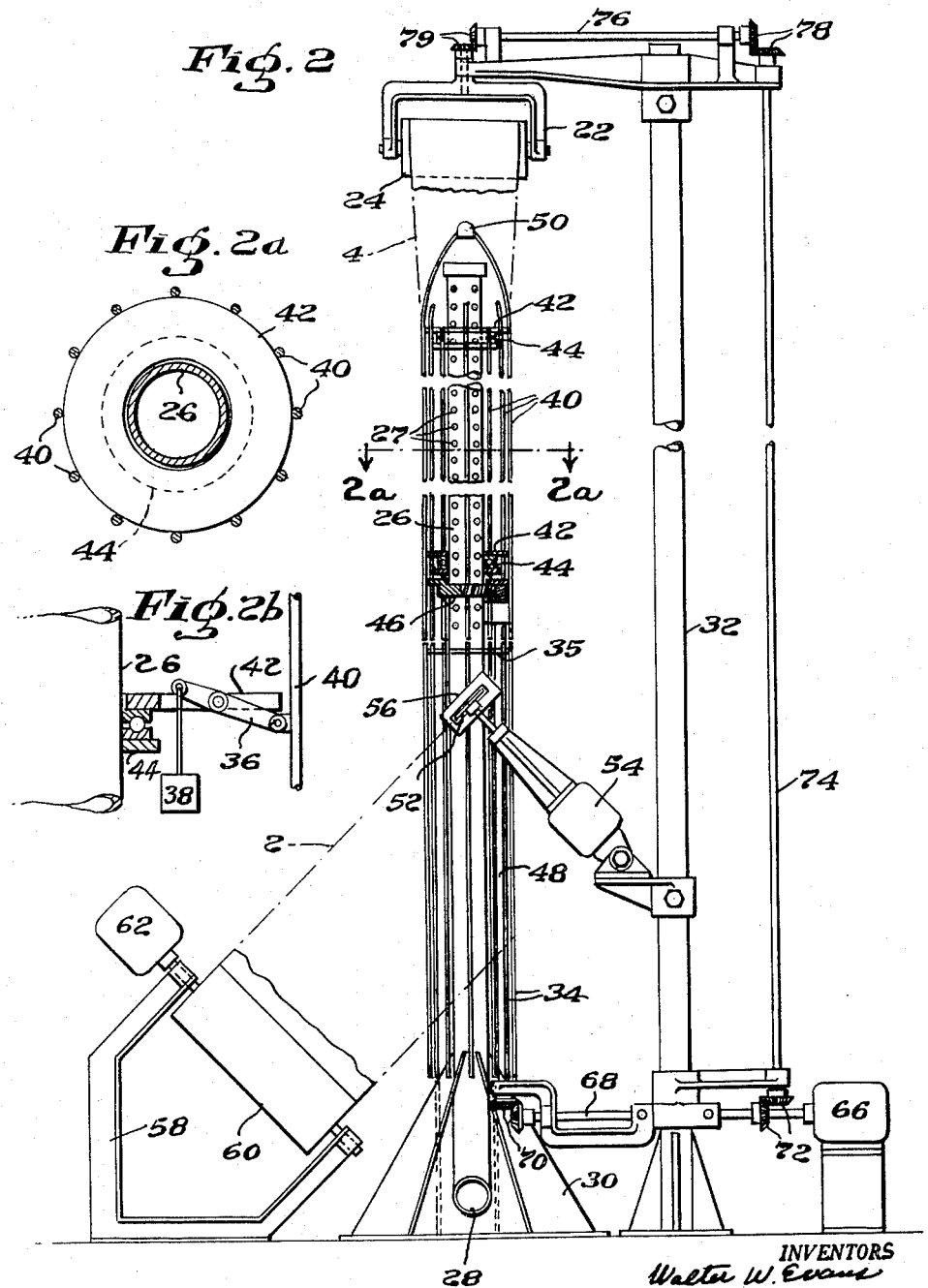

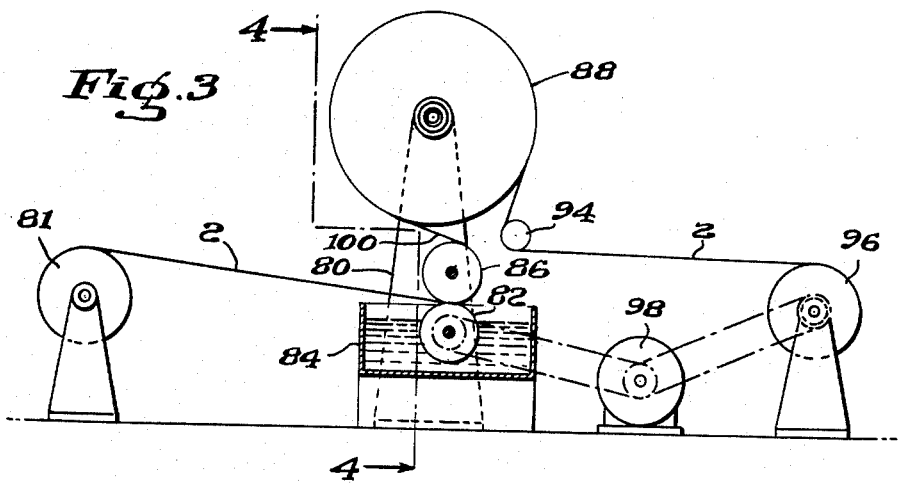
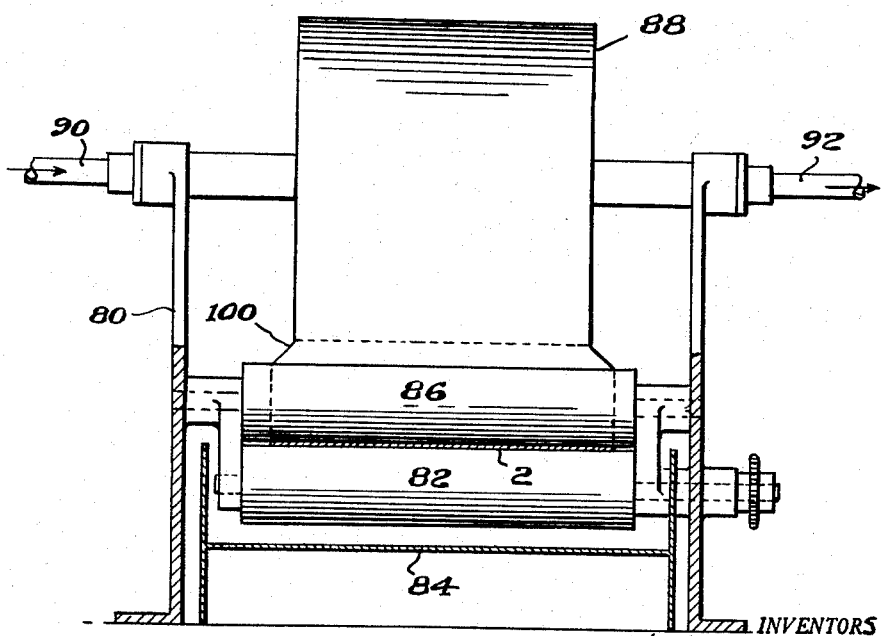

2,962,795

METHODS FOR PRODUCING CONTINUOUS BIAS CONSTRUCTED GLASS TEXTILE FABRIC

Walter W. Evans, East Kingston, Lawrence E. Oliver, Northampton, and Carl R. Ronnquist, Exeter, N.H., assignors to Exeter Manufacturing Company, Exeter, N.H., a corporation of New Hampshire Original application June 26, 1953, Ser. No. 364,383, now Patent No. 2,879,581, dated Mar. 31, 1959. Divided and this application Nov. 17, 1958, Ser. No. 780,655

10 Claims. (Cl. 28—76)

This invention relates to textile materials of glass fiber and is a division of application Ser. No. 364,383, filed June 26, 1953, now Patent No. 2,879,581, March 31, 1959. More particularly, it relates to novel methods for producing in continuous lengths glass fiber textile materials of bias construction.

By the use of fine glass fibers it is possible to produce textile materials having characteristics not available with the common natural and synthetic fibers. For example, such glass textile materials have high strength, high electrical insulation value, and resistance to relatively high temperature, while at the same time are flexible and may be handled much the same way as conventional textile materials such as wool, cotton, and the well known synthetics such as rayon, nylon, and the like. Glass fibers have a number of disadvantages, however, the most important of which is the lack of resistance of woven glass fabrics to physical distortion. The glass yarns of such fabrics are so slippery that they do not adhere to one another at their intersections, so that if woven glass cloth is pulled in a direction not parallel to the yarns it will usually be distorted so as to be unusable, and this is particularly true of open weave fabrics.

Another disadvantage of glass cloth is its lack of resistance to bending, so that if a glass cloth is creased, particularly if it is repeatedly creased in the same spot, almost invariably the glass fibers will be broken.

Because of the above disadvantages of glass fiber material it has heretofore been thought impossible to provide a uniform continuous glass fiber cloth of bias construction, so that heretofore the known advantages of bias construction could not be taken advantage of with glass cloth, the main one of such advantages being the high elongation characteristics which are essential, for example, in molding processes and in the electrical insulation art, particularly as to non-uniformly shaped parts. With such uses, for example, the high strength, lack of chemical reactivity, and high insulation value of glass fiber, and its ability to withstand high temperatures are of great advantage. Hence, the use of glass cloth of bias construction has heretofore been limited to extremely short lengths of glass cloth as cut on the bias from a flat strip of conventional woven glass fiber material. Such short lengths, besides being generally inconvenient to handle, are useless, for example, in the electrical insulation art since such art requires long, uniform, continuous lengths to provide a smooth uniform insulating layer.

We have found that glass cloth of bias construction may be produced in uniform, continuous, long lengths, that is, in lengths of 50 feet to, for example, 250 yards or longer, and thus for the first time we have provided in uniform, continuous, long lengths a glass cloth which combines the above-mentioned advantageous characteristics both of glass fibers and of bias construction.

In our process we utilize a uniform continuous square woven tubular strip of glass cloth preferably of continuous filament glass yarn which may be woven by well known methods on a conventional textile loom, such cloth having its warp threads parallel to the axis of the tube, and its filling threads around the periphery of the tube in a plane generally perpendicular to the axis of the tube. This continuous tube of woven glass fabric is treated in a bonding step with a bonding material which may be set or otherwise solidified, preferably with the cloth in tubular form, for example by reacting, drying, solvent-elimination, or cooling, thereby adhering together the crossed filling and warp yarns with resilient connecting elements at least at a substantial number of their intersections, and thus preventing any substantial relative movement thereof.

It is preferable that the bonding material have the physical characteristic of adhering to the woven glass fiber material itself, although such may not be essential if the bonding material forms a sheath around the yarn intersections. Also, the interstices of the cloth should be left open to provide a foraminous and flexible product. We have further found it desirable that the bonding material and treatment increase the distortion-resistance of the cloth so that it has a strength on the bias of at least ½ pound per inch of width, and preferably of at least 1 to 3 pounds per inch of width. Various bonding materials may be used, such as polyvinyl alcohol alone or with other materials.

After the bonding treatment, the continuous length of bonded tubular glass cloth is then cut along a continuous helical path at any desired angle to the axis of the tube, the most common angle being 45°, the resilient connecting elements providing sufficient strength even to open weave bias-cut material so that it may be readily handled by conventional handling methods as by rolling up on a roll, or it may be run through subsequent fabric finishing steps without special precautions so long as the integrity of the bonds is not substantially destroyed.

In some instances, we have found that the continuous strip of bias constructed glass cloth resulting from the above described process is somewhat wrinkled due to the material becoming distorted while still in the tubular form before the bonding step has been carried out. Though such wrinkles are not detrimental for a number of uses, we have further found that they may be removed by an additional dewrinkling step. Such step consists in treating the bonded fabric with a softening agent to reduce the strength of the bonds, as by applying a suitable solvent to the bonded material, so that the strength of the bias-cut cloth becomes substantially that of an unbonded bias-cut strip, then applying tension to a limited unsupported reach, say of the order of 1 to 6 inches, of said fabric to elongate it along the bias sufficiently to reduce the width of said strip by about 0.5 to 12%. After the width has been so reduced, the cloth is supported while again being bonded to re-establish the resilient connecting elements as before. This step is most advantageously carried out while the cloth is continuously advanced through a tensioning zone in which tension is continuously applied to said unsupported reach to elongate it as the fabric advances, the fabric then being again supported and set so as to re-establish the resilient connecting elements. This may be done, for example, if polyvinyl alcohol is used as a bonding material, by a heating step after which the fabric may be wound up in the usual manner. It is also contemplated that additional bonding material may be applied which also acts as a softening agent in the dewrinkling step to provide a continuous bias-cut glass cloth after being treated by the dewrinkling step which will be of greater strength than the cloth before dewrinkling.

By the above described method, as well as by various means hereinafter more fully explained, we are enabled to provide a strong glass textile material of bias construction in continuous, uniform, long lengths as is essential in many manufacturing proccesses and which has not heretofore been available. For the purpose of more fully explaining a preferred embodiment of our invention, particularly in regard to novel apparatus useful in carrying out the method of our invention, as well as the novel product thereof, reference is made to the following drawings in which:

Fig. 1 is a diagrammatic view of apparatus which may be used in carrying out the method of our invention;

Fig. 2 is a side elevational view of a novel integrated continuous tubular glass cloth drying and bias cutting means of our invention;

Fig. 2a is a cross sectional view of the means of Fig. 2 taken on the line 2a—2a of Fig. 1;

Fig. 2b is a side elevational view of a portion of the means of Fig. 2, showing a modification thereof;

Fig. 3 is a side elevational view of the novel dewrinkling mechanism of our invention;

Fig. 4 is a sectional view of the dewrinkling mechanism of Fig. 3 taken on the line 3—3 of Fig. 3;

Fig. 5 is a view of the continuous tubular glass cloth as employed in the method of our invention;

Fig. 6 is a view of the continuous glass cloth of bias construction of our invention; and Fig. 7 is a diagrammatic enlarged view of the glass cloth of Fig. 6 or 7 in which the yarns are bonded together at their intersections.

Referring to Fig. 1, a uniform continuous square woven (60—58) tubular glass cloth strip 4 (Fig. 5) is led from an input roll 12 to a treating mechanism comprising a dip roll 14 running partially submerged in a tank 16 containing a suitable bonding material such as high viscosity polyvinyl alcohol. An applicator roll 18 is mounted above and in contact with said dip roll 14, so that when the tubular woven cloth 4 is run between the nip of said rolls, the bonding material in tank 16 is applied to the tubular woven glass cloth. The dip and applicator rolls 14 and 18 are driven by any suitable means, not shown. The tubular woven glass cloth 4 is then wound up on a suitably driven take-up roll 20, preferably before any setting has taken place.

The tubular woven glass cloth as so treated with the bonding material, but unset, may then be transferred as already wound in a roll to the novel integrated continuous tubular glass cloth drying and bias cutting mechanism as diagrammatically shown in Fig. 1, and more completely shown in Fig. 2. Such mechanism includes a main base 30 having mounted thereon an upstanding cantilever open framework of generally circular cross-sectional configuration. The framework includes a lower non-rotating framework having fixed frame members 34 directly mounted on said base, and a rotatable upper cantilever framework of frame members 40 forming the free upper end of said cantilever open framework. Glass cloth support means are provided at the input end of said mechanism, said means including a bracket 22 rotatably mounted on supplemental frame 32 adapted rotatably to support a roll 24 of tubular unbonded glass cloth 4 with its axis perpendicular to the axis of said cantilever open framework at a distance spaced from the free upper end of said cantilever framework to guide said glass cloth so that it may be drawn in tubular form over said cantilever framework.

In the central portion of the lower framework centrally of frame members 34 is mounted an air pipe 26 which extends upward beyond said fixed framework, said air pipe being attached to the upper ends of frame members 34 of said framework by a disk 35. The central air pipe 26 has at its lower end an opening 28 in base 30 so that a suitable supply of drying air, preferably heated, may be provided to said air pipe and to perforations 27 in its upper end portion to allow said air to pass outwardly to dry tubular cloth passed over said framework.

The upper portion of said air pipe extending beyond the lower fixed framework provides a support for the rotating upper cantilever framework of frame members 40 and supporting disks 42, said rotating upper frame members being mounted on said disks with suitable thrust bearings 44 interposed between said supporting disks 42 and said fixed air pipe 26, and being driven by ring gearing 46 by means of a vertically extending shaft 48 within the periphery of lower frame members 34, as hereinafter more fully explained. The frame members 40 making up the upper framework are curved inwardly at their upper ends and meet in a cap 50 which forms the upper free end of the rotating cantilever framework.

To reduce the formation of wrinkles in the tubular glass cloth as it is being dried, as shown in Fig. 2b, we may provide a pivoted mounting for upper frame members 40, such mounting comprising a lever 36 pivotally mounted in a radial slot in upper and lower support disks 42, each of said levers being pivotally attached at its outer end to frame members 40 in a lowered position and having suspended at its inner end a weight 38 to press said frame member 40 resiliently outward against the cloth tube.

A bias cutting disk knife 52 suitably driven by a motor 54 is mounted on supplemental frame 32, with the knife itself adjacent the fixed lower framework and cooperating with a slotted plate 56 on said lower framework to cut the tubular cloth 4 as it passes downwardly over the framework. Such knife is preferably spaced just below the upper rotating framework and is arranged at an angle of 45° to cut the tubular woven cloth 4 in a helical path as it passes downwardly onto the lower fixed framework, the resulting bias-cut cloth 2 (Fig. 6) being wound up on a roll 60 suitably mounted at a 45° angle on roll frame 58 adjacent the main base 30 of the apparatus, said roll being suitably driven by motor 62.

The upper rotating cantilever framework and the bracket 22 of support roll 24 are rotated about the longitudinal axis of said cantilever framework, such speed being in timed relation with the speed at which take-up roll 60 feeds the tubular cloth downwardly over the upper framework past bias cutting knife 52. For example, if the bias-cut cloth 2 is wound up on roll 60 at a speed of 100 feet per minute, the upper framework and bracket 22 will be rotated at a peripheral speed of about 70 feet per minute for a 45° bias cut. Such drive is accomplished by a suitable motor 66 driving upper framework drive shaft 48 through motor shaft 68 and bevel gears 70, and also driving roll bracket 22 about a vertical axis parallel to the axis of the cantilever framework through bevel gears 72 on motor shaft 68 and vertical shaft 74, bevel gears 78 connecting horizontal shaft 76 and vertical shaft 74 and bevel gears 79 connecting bracket 22 and horizontal shaft 76, said vertical shaft 74 and horizontal shaft 76 being mounted in suitable bearings on supplemental frame 32.

In operation, the unbonded tubular woven material is fed downwardly in tubular form from roll 24 while rotating about its own axis, said roll rotating both about its own and a vertical axis over the cap 50 of the rotating upper framework while drying air is blown outwardly through the perforations 27 in an air pipe 26. In order to provide a relatively wrinkle-free product, it is desirable that the air be free to pass through the upper portion of the rotating frame members 40 so that the drying air will resiliently expand the woven glass tube and at least partially set the bonding material while the tube is in unsupported condition, that is, before said expanded tube touches any portion of the upper framework. As the material is fed downwardly over the upper framework, rotating in synchronism therewith, the bonding material is completely set to form resilient connecting elements 10 at the intersections of the warp yarns 6 and filling yarns 8 (Fig. 7), so that when the tube 4 passes beyond the rotating framework onto the fixed framework, it will be completely bonded. The resilient mounting of upper frame members 40 aids in providing a wrinkle-free product by resiliently pressing the glass cloth tube outwardly to expand it during the bonding step. The tube is then continuously bias-cut in a 45° helical path by rotating disk knife 52 to produce a continuous strip of bonded bias-cut glass cloth 2 (Fig. 6), and such strip is then wound up on roll 60, said roll being driven by its motor 62 so that the speed of said strip is in timed relation with the rotation of the upper framework and of roll bracket 22, so that as the glass cloth tube 4 is continuously rotated and fed downwardly, such rotation will be at the same speed of movement as the rotation of the upper cantilever framework and of the feed roll bracket 22.

The uniform continuous length of bonded bias-cut glass cloth 2 as wound up on roll 60 has suitable strength and handling characteristics and may be directly used for most purposes. In a few instances, however, particularly when relatively open weave tubular woven glass cloth is used as a starting material, it is distorted sufficiently in the tubular form before bonding so that wrinkles appear in the bias-cut cloth as wound up on roll 60. Also, when the treated tubular glass cloth is set in flat form, as by drying on cylinders, the dewrinkling step is advantageous to eliminate the selvage wrinkles which would otherwise be present in the cloth after bias cutting.

Under such circumstances, we prefer to carry out a dewrinkling step by the use of a novel dewrinkling apparatus diagrammatically shown in Fig. 1, and best shown in Figs. 3 and 4. Such a dewrinkling apparatus includes a frame 80 having mounted thereon an input roll 81 adapted to feed material to a dip roll 82 running in a tank 84 of suitable solvent, for example water, for softening the resilient connecting elements 10. An applicator roll 86 mounted on frame 80 runs in contact with said dip roll and the cloth is passed therebetween to apply the softening agent thereto. Above the applicator roll 86 and slightly spaced therefrom is rotatably mounted on frame 80 a drying drum 88, said drum being suitably heated by steam supplied through inlet line 90 and having a condensate outlet line 92. A small guide roll 94 is mounted on said frame so that the material may be passed almost entirely around said drying drum to provide complete drying and setting of the bonding material to re-establish the resilient connecting elements 10. A driven output roll 96 is provided for winding up the cloth after it has been suitably bonded and for providing suitable tension to the bias-cut cloth 2 as it continuously passes through the dewrinkling mechanism, a motor 98 being provided for driving both said output roll and the applicator and dip rolls.

In operation, the bias-cut glass cloth 2 to be dewrinkled is passed from input roll 81 between applicator and dip rolls 86 and 82, respectively, and is then passed partially around said applicator roll to support the cloth while it is in softened condition. It is then passed unsupported for a limited reach 100 between the upper portion of said applicator roll and the lower portion of said drying drum tangential to said rolls, tension being applied to said limited reach by driving output roll 96 at a higher speed than rolls 82 and 86 sufficiently to remove the wrinkles in said fabric by elongating it and reducing its width, such elongation and reduction in width being about 0.5 to 12% depending upon the wrinkles in said material and the extent to which it is desired to remove them, preferably about 1%. In practice, the unsupported reach 100 is commonly of the order of 1 to 6 inches, preferably about 4 inches. After the cloth has passed across said unsupported reach it is then again supported as it passes onto drying drum 88 and continues to be supported as it is rebounded until the resilient supporting members 10 are again substantially re-established in elongated condition, after which it may pass from the drying drum 88 around guide roll 94 and be wound up on output roll 96.

In addition to simply dewrinkling the continuous bias-cut cloth as heretofore pointed out, additional bonding material may be applied by our dewrinkling mechanism to increase the strength of the continuous bias-cut cloth and provide a bias-cut cloth after the dewrinkling step which is stronger than the cloth before dewrinkling. In such case we have found it practical to simply provide additional bonding material, for example polyvinyl alcohol, in tank 84, which material itself serves as a softening agent to soften the material already on the bias-cut cloth 2, and also to provide an additional amount thereon.

By the use of our novel dewrinkling mechanism we are enabled to provide a uniformly flat continuous wrinkle-free bias-cut glass cloth in open as well as close weaves, and at the same time to provide additional strength in such cloth if such is desired.

Referring now to Figs. 5, 6, and 7, the construction of our novel uniform continuous glass cloth strip 2 of bias construction may readily be seen.

In Fig. 5 is shown an isometric view of a section of the continuous tubular square woven (60–58) glass cloth strip 4 as employed in the specific embodiment of our invention, such tubular woven glass cloth having warp yarns 6 parallel to the axis of the tube and filling yarns 8 extending around the periphery of the tube generally perpendicular to the axis of the tube, so that such tube, after its intersecting yarns have been bonded to provide resilient connecting elements 10 at the intersections of the warp and filling threads, may be helically cut, for example at an angle of 45° to the axis of the tube, to provide the novel continuous bias constructed glass cloth 2 of our invention.

In Fig. 6 a portion of the continuous strip of bias constructed glass cloth 2 is shown with the warp 6 and filling threads 8 thereof at 45° to the axis of the strip. We also contemplate that it may be desirable for special purposes to have other angular relations, such as warp yarns at 30° and filling yarns at 60°, respectively, to the axis of the strip. In Fig. 7 is shown a diagrammatic enlarged view of the intersection of a warp yarn 6 and filling yarn 8 of the cloth of Fig. 6 particularly illustrating the bonding material which forms a resilient connecting element 10 between the yarns at such intersection. With a substantial number of the intersections of the yarns of the bias constructed glass cloth so connected by a resilient material, a uniform continuous bias constructed glass cloth 2 having suitably high strength may readily be provided and at the same time, due to the resiliency of the connecting elements 10, such cloth will be deformable without damaging the glass fibers themselves, so that, for example, when covering non-uniformly shaped materials, as is common in the electrical insulation art, the bias constructed glass cloth of our invention will deform in a non-uniform manner as required to provide a tight fit of such insulation material. The resilient connecting elements should provide elongation at least of the order of 0.5, although the desired amount of elongation will be determined by the use to which the bias constructed material is to be put.

Thus it will be seen that we have provided a novel method for producing in continuous, uniform, long lengths glass fiber textile material of bias construction, and have also provided novel means for producing such fabric, as well as a novel uniform continuous bias constructed glass cloth. Various other means and modifications for carrying out our invention within the spirit thereof and the scope of the appended claims will be apparent to those skilled in the art.

We claim:

1. The method of making a continuous uniform strip of glass cloth of bias construction which comprises providing a continuous tube of woven glass cloth, treating said tube with bonding material to bond the yarns of the cloth together at their intersections, cutting said tube along a helical path to provide a continuous uniform strip of bias-cut cloth, softening said cloth by applying a softening agent thereto, and subsequently stretching said cloth along the bias to remove wrinkles therefrom.

2. The method of making a continuous uniform strip of glass cloth of bias construction which comprises providing a continuous tube of glass cloth, treating said tube with bonding material from a liquid medium, heating to set said bonding material to bond the yarns of said cloth together at their intersections, cutting said tube along a continuous helical path, softening said cloth by applying a softening agent thereto and applying tension to a limited reach of said cloth along the bias to stretch said cloth sufficiently to reduce its width by 0.5 to 12% to remove wrinkles therefrom.

3. The method as defined in claim 2 wherein the cloth is continuously advanced through a tensioning zone and the tension is continuously applied to an unsupported reach of cloth in said zone as the cloth advances.

4. The method of making a continuous uniform strip of glass cloth of bias construction which comprises providing a continuous tube of glass cloth, treating said tube with bonding material from a liquid medium to bond the yarns of said tube together at their intersections, setting said bonding material to bond the yarns of said tube together at their intersections, cutting said tube along a continuous helical path, applying additional bonding material to said cloth from a liquid medium, stretching said cloth along the bias to reduce the width by 0.5 to 12% to remove wrinkles therefrom, and again setting said bonding material to bond the yarns of said tube together at their intersections.

5. The method of making a continuous uniform strip of glass cloth of bias construction which comprises providing a continuous tube of woven glass cloth, treating said tube with a bonding material from a liquid medium to bond the yarns of said tube together at their intersections, setting said bonding material to bond the yarns of said tube together at their intersections, cutting the tube along a helical path to provide a continuous strip of bias-cut cloth, treating said strip with a softening agent to soften said bonding material, continuously advancing the softened cloth between a pair of spaced rolls to place an unsupported reach of the cloth from one to six inches in length tangential to said rolls under tension in the direction of travel to reduce the width of the cloth from 0.5 to 12% to remove wrinkles therefrom, and again setting the dewrinkled cloth to bond the yarns together at their intersections.

6. The method of making a continuous uniform strip of glass cloth of bias construction which comprises providing a continuous tube of woven glass cloth, treating said tube with bonding material to bond the yarns of the cloth together at their intersections, cutting said tube along a helical path to provide a continuous uniform strip of bias-cut cloth, and subsequently stretching said cloth along the bias to remove wrinkles therefrom.

7. The method of making a continuous uniform strip of glass cloth of bias construction which comprises providing a continuous tube of glass cloth, cutting said tube along a continuous helical path to provide a continuous strip of bias-cut cloth, applying bonding material to said cloth from a liquid medium, stretching said cloth along the bias to reduce the width by 0.5 to 12% to remove wrinkles therefrom, and setting said bonding material to bond the yarns of said cloth in stretched condition together at their intersections.

8. The method of making a continuous uniform strip of glass cloth of bias construction which comprises providing a continuous tube of glass cloth, cutting said tube along a continuous helical path to provide a continuous strip of bias-cut cloth, applying bonding material to said cloth from a liquid medium, stretching said cloth strip along the bias to reduce the width by 0.5 to 12% to remove wrinkles therefrom by continuously advancing said strip through a tensioning zone and continuously therein applying tension to a longitudinally extending unsupported reach of said cloth strip in said zone as said strip advances therethrough, thereafter supporting said cloth strip and at least partially setting said bonding material to bond the yarns of said cloth in stretched condition together at their intersections.

9. The method as claimed in claim 8 wherein said cloth strip is advanced between a pair of spaced rolls to tension and stretch said cloth strip by providing an unsupported reach thereto.

10. The method as claimed in claim 9 wherein said unsupported reach is of one to six inches in length tangential to said rolls.

References Cited in the file of this patent

UNITED STATES PATENTS

| Number | Name | Date |
|---|---|---|
| 182,892 | Chase et al. | Oct. 3, 1876 |
| 1,356,485 | Bunker | Oct. 19, 1920 |
| 2,110,856 | Gardner et al. | Mar. 15, 1938 |
| 2,349,710 | Evans | May 23, 1944 |
| 2,354,110 | Ford et al. | July 18, 1944 |
| 2,769,222 | Southwell | Nov. 6, 1956 |